Patented Dec. 5, 1933

1,938,162

UNITED STATES PATENT OFFICE 1,938,162

PRODUCTION OF COMPOUNDS FROM PROPYLENE

James William Woolcock, Norton-on-Tees, England, assignor to Imperial Chemical Industries Limited, London, England, a British company No Drawing. Application April 16, 1930, Serial No. 444,885, and in Great Britain April 30, 1929

6 Claims. (Cl. 260—98)

This invention relates to the production of compounds from propylene such as isopropyl alcohol and isopropyl acetate. It is known that propylene is absorbed by strong sulphuric acid with the formation of isopropyl hydrogen sulphate and/or di-isopropyl sulphate but from these bodies isopropyl alcohol is obtained only in small yield owing to the polymerization of the propylene and/or the compound it forms with sulphuric acid. Similarly in the known process for the production of isopropyl acetate by distilling sulphuric acid which has absorbed propylene, with sodium acetate, the yield of ester is small. It is also known that propylene can be absorbed in dilute sulphuric acid, and it has further been proposed to use cooled concentrated sulphuric acid, but in both cases the rate of absorption is very slow and satisfactory yields cannot be obtained.

According to the present invention I absorb propylene in a mixture containing a reactive acetic compound and a reactive sulphuric compound. The reactive acetic compound is preferably acetic acid and the reactive sulphuric compound is preferably sulphuric acid. I may also use mixtures containing an acid ester of sulphuric acid or mixtures containing acetic anhydride. Diluents may be added such as alcohol which are miscible with the said mixtures. If diluents are employed they should possess good solubility for propylene and they are preferably non-aqueous, although they may contain one or more hydroxyl groups. The presence of more than a few per cent of water is definitely disadvantageous.

As a result of using my improved absorbent it is possible to obtain sharply selective absorption in a simpler and more effective manner than when employing sulphuric acid alone. The process has the additional advantage that isopropyl acetate can be produced direct in a substantial quantity whereas if sulphuric acid is used as the absorbent, iso-propyl alcohol is obtained and an esterification step is usually necessary to convert it into the commercially valuable product, namely, isopropyl acetate.

When a mixture of concentrated sulphuric acid and glacial acetic acid is employed for the absorption of propylene, not only is isopropyl hydrogen sulphate and/or di-isopropyl sulphate formed, but also isopropyl acetate. The proportion of propylene which reacts to give the sulphuric ester is usually greater than that reacting to give the acetic ester, but varies according to the proportions of sulphuric acid and acetic acid in the mixture, as also with other conditions, such as temperature, presence of diluents, and the amount of water present. The isopropyl acetate may be recovered by distillation in vacuo or separated as a top layer when water is added to the mixture and the sulphuric esters are readily converted into isopropyl alcohol by hydrolysis. The sulphuric acid esters remaining after separation of the isopropyl acetate by vacuum distillation may be utilized for further absorption by propylene by addition of appropriate amounts of acetic and sulphuric acid.

Example 1

A mixture of equal volumes of 99.5 per cent sulphuric acid and glacial acetic acid was treated with propylene at a temperature of 40° C. until no more of the gas was absorbed. The mixture was then diluted with an equal volume of water whereupon a liquid layer consisting of substantially isopropyl acetate and alcohol separated, and was removed. This liquid was washed with water and distilled to isolate the pure ester and alcohol. The diluted acid layer was heated to boiling for some time in order to hydrolyze the sulphuric esters, and a mixture of isopropyl alcohol and water was collected as distillate. This was dehydrated with quicklime and the pure isopropyl alcohol recovered. On the amount of propylene initially absorbed about 53 per cent appeared as isopropyl alcohol and 27% as isopropyl acetate, representing a yield of 80 per cent.

In a comparative experiment the yield of isopropyl alcohol from propylene and cold 99% sulphuric acid alone was only 5% owing to losses by polymerization. The method of the present invention may also be applied to the separation of propylene from mixtures with inert gases even when the propylene concentration is relatively small. If higher olefines are present they may be removed by a preliminary treatment with cooled 80% sulphuric acid after which the propylene is absorbed as described previously whereby the propylene derivative can be obtained in a state of purity. Furthermore, propylene may be separated from ethylene, since I have further discovered that ethylene is substantially unaffected by a mixture of sulphuric acid and acetic acid or the equivalent mixtures hereinbefore described. This is surprising in view of the fact that ethylene is readily absorbed by sulphuric acid alone. Sulphuric acid alone is not satisfactory for the separation of propylene from ethylene as under the conditions necessary for the absorption of propylene some ethylene is always absorbed at the same time.

According to my present invention therefore I bring the mixed gases into contact with a mixture of sulphuric acid and acetic acid or equivalents such as a mixture of acetic acid and an acid ester of sulphuric acid. The ethylene is unaffected and passes on whilst the propylene is retained by the mixture in the manner already described. The ethylene can be further separated from the remaining gases by a subsequent treatment with sulphuric acid alone, whereby the ethylene is absorbed and can be recovered as ethyl alcohol by hydrolysis, or the ethylene-containing gas can be concentrated by known methods.

The method of my present invention moreover affords a means for the quantitative determination of either propylene or ethylene in gas mixtures containing them both.

It has further been found that the proportion of isopropyl alcohol obtainable from the said mixture of sulphuric and acetic esters may be varied by a controlled heating or distillation of the mixture with water, without separating the layer of isopropyl acetate which separates on the addition of water. The longer the period of heating the more isopropyl acetate becomes converted into isopropyl alcohol; after a predetermined time the heating is discontinued and the layer containing the isopropyl acetate is separated and distilled; the aqueous layer is distilled separately to recover isopropyl alcohol. Any desired proportion of isopropyl alcohol in relation to isopropyl acetate may thus be obtained. By this procedure charring of the layer containing the isopropyl acetate is avoided and its isolation is facilitated.

*Example 2*

Oil gas, containing 25 per cent. of propylene, 30 per cent of ethylene, and a balance of hydrogen, methane, and similar hydrocarbons, was passed into a mixture of equal volumes of 99.5 per cent. sulphuric acid and glacial acetic acid at a temperature of 40° C. From the saturated acid mixture isopropyl alcohol and isopropyl acetate were recovered in the manner described above.

The exit gas contained 5 per cent. of propylene, and 38 per cent. of ethylene. This gas could be washed with further quantities of acid liquor to remove the residual propylene or it could be further fractionated with the aid of active carbon, or passed into concentrated sulphuric acid at a temperature of 65° C., whereby the propylene was polymerized and ethyl alcohol substantially free from isopropyl alcohol was obtained on hydrolysis.

I declare that what I claim is:—

1. Process for the production of isopropyl alcohol which includes the step of causing a reaction to occur between propylene and sulphuric acid by bringing gases containing propylene into contact with sulphuric acid containing not more than a few per cent of water diluted with about an equal volume of glacial acetic acid, at an elevated temperature of about 40° C. so as to produce a reaction mixture containing a substantial amount of isopropyl hydrogen sulphate, the conditions being so chosen as to avoid charring.

2. Process as set forth in claim 1 which includes the further steps of diluting the reaction mixture with water, separating and distilling the nonaqueous layer, and distilling the aqueous layer.

3. Process as set forth in claim 1 which includes the further step of distilling the reaction mixture in vacuo.

4. The process of separating propylene and ethylene which consists in passing a gas containing them in contact with a mixture of about equal volumes of glacial acetic acid and sulphuric acid containing not more than a few per cent of water, at a temperature of about 40° C.

5. Process for the absorption of olefines from gases containing them in which the higher olefines are absorbed in cooled 80% sulphuric acid and the propylene in a mixture of about equal volumes of sulphuric acid containing not more than a few per cent of water and glacial acetic acids at about 40° C.

6. Process for the separation of propylene and ethylene in which the major portion of the propylene is absorbed in a mixture of sulphuric and glacial acetic acids containing not more than a few per cent of water, the remainder being removed by polymerization by concentrated sulphuric acid at a temperature of 65° C., the ethylene being also absorbed to give ethyl hydrogen sulphate.

JAMES WILLIAM WOOLCOCK.